UNITED STATES PATENT OFFICE.

PHILIP ZIEBER, OF READING, JOHN HANCOCK, OF PHILADELPHIA, AND PATRICK S. DEVLAN, OF READING, PENNSYLVANIA.

IMPROVEMENT IN COMPOSITIONS FOR LUBRICATING MACHINERY.

Specification forming part of Letters Patent No. 5,288, dated September 11, 1847.

*To all whom it may concern:*

Be it known that we, PHILIP ZIEBER, of the borough of Reading, county of Berks, and State of Pennsylvania, and JOHN HANCOCK, of the city and county of Philadelphia, State of Pennsylvania, and PATRICK S. DEVLAN, of the said borough of Reading, county of Berks, and State of Pennsylvania, have invented a new composition of matter to be used instead of oil on the journals, bearings, or gudgeons of railroad-cars and other machinery, which we call "Zieber, Hancock, and Devlan's Machinery - Oil;" and we do hereby declare the following to be a full and clear recipe or mode of preparing the same for use.

The nature of our composition consists of the following ingredients, viz: To thirty gallons of water add ten pounds of carbonate of soda, two pounds of gum-tragacanth dissolved. We wish it to be understood, however, that we do not confine ourselves to gum - tragacanth, as there are other gums of a similar nature that may be substituted. Neither do we confine ourselves to the quantities herein set forth, as they may be varied. Heat the liquid to boiling, and strain the same through a cloth or fine sieve. The carbonate of soda has the effect to destroy the hardening properties of the gum.

What we claim as our invention, and desire to secure by Letters Patent, is—

The combination or admixture of water, sal-soda, and gum - tragacanth—the ingredients herein named—in the manner and for the purposes herein specified.

PHILIP ZIEBER. [L. S.]
JOHN HANCOCK. [L. S.]
PATRICK S. DEVLAN. [L. S.]

Witnesses:
WILLIAM GRAEFF,
E. H. ZIEBER.